Jan. 15, 1929.
R. N. KIRCHER
1,698,915
MEANS FOR SUPPORTING KETTLE BAILS
Original Filed April 13, 1927
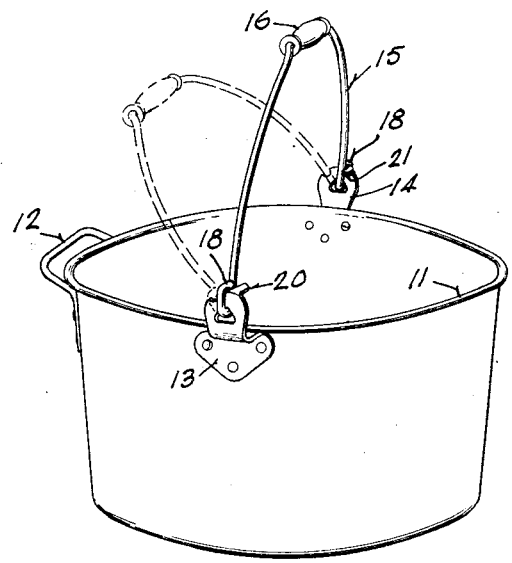
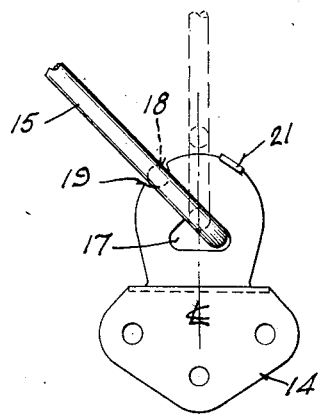
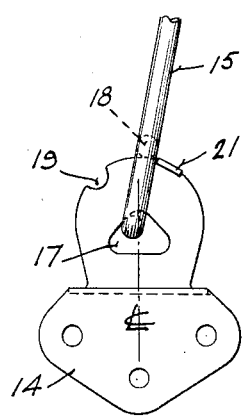
WITNESS:
INVENTOR.
RALPH N. KIRCHER
BY
ATTORNEYS.

Patented Jan. 15, 1929.

1,698,915

UNITED STATES PATENT OFFICE.

RALPH N. KIRCHER, OF WEST BEND, WISCONSIN, ASSIGNOR TO WEST BEND ALUMINUM COMPANY, OF WEST BEND, WISCONSIN, A CORPORATION OF WISCONSIN.

MEANS FOR SUPPORTING KETTLE BAILS.

Original application filed April 12, 1927, Serial No. 183,547. Divided and this application filed September 3, 1927. Serial No. 217,359.

This invention relates to an improvement in the construction of the ears which are attached to a kettle, and resides in the peculiar formation of the ears, whereby the bail of the kettle, when released by slackening the grip of the hand thereon, automatically assumes an inclined position, with its handle clear of the kettle at one side of the latter. This automatic action in so positioning the bail at one side of the kettle is effected by providing a notch in the top of the ear at one side of the transverse vertical central line thereof and a central perforation in the ear with a portion thereof extending beyond the other side of the said vertical central line, so as to afford a clearance for the lower bend of the loop of the bail, and so permit the upper return bend of the loop to pass freely into the said notch.

In its inclined position, the handle of the bail is above the zone of heat, and therefore remains at all times at a low temperature, so that the handle may be grasped and the kettle lifted without discomfort to the person doing so.

The opposite ears of the kettle which are engaged by the loops at the ends of the bail, are provided with projections extending preferably in alignment, such projections being formed on the ears on the other side of the transverse vertical central line thereof, at a distance from such line which is approximately equal to that of the notches therefrom. Such projections are adapted to engage the bail when the latter is thrown over the center to the opposite or forward side, and act as positive stops to retain the bail in elevated position, and prevent it from being brought into engagement with the pouring edge of the kettle.

The specific features of the invention will now be described, and the novelty thereof pointed out in the appended claims.

In the accompanying drawing:

Figure 1 is a perspective view of a kettle showing my invention applied thereto, and illustrating the manner of its normal operation.

Fig. 2 is an enlarged view in inside elevation of the farther ear of the kettle, illustrating the automatic operation of the bail in assuming its rearwardly inclined position.

Fig. 3 is a like view illustrating the arrested position of the bail when it has been thrown over the center, and is prevented from coming into engagement with the pouring edge of the kettle.

In the drawing, Fig. 1, the numeral 10 indicates a kettle of ordinary construction having at the side opposite the pouring edge 11, a handle 12. Ears 13 and 14 are attached to opposite sides of the kettle in a line at a right angle to the line extending from the pouring edge 11 to the handle 12. A bail 15 of usual construction, provided with a handle 16, is engaged in central transverse openings 17 in the ears, by means of which arrangement the kettle may be lifted and supported during a pouring operation. The openings 17 are preferably triangular, with the apex of the triangle in the transverse vertical central line of the ears.

In the arrangement illustrated, the free ends of the bail are passed through the openings 17 from the opposite inner sides of the ears, and returned at the outer side of the ears in parallelism, and then returned horizontally as at 18 to form loops at the lower ends of the bail.

The edges of the ears nearest the handle 12 are notched as at 19 for the reception of the returns 18 of the bail, whereby the bail is supported in the inclined position shown in Fig. 2, the bends at the lower extremities of the bail moving in the clearance provided by the openings 17, to permit the returns 18 to be seated in the said notches, the said bends at such time engaging the opposite inclined wall of the openings 17, which wall is in substantial alignment with the said notch, in the manner shown in Fig. 2. The dotted lines in Fig. 2 show the position of the bail when the kettle is being lifted, and upon resting the kettle, the returns 18 of the bail will slide over the curved upper edge of the ears and drop automatically into the notches 19, and so support the bail in the inclined position shown. The bail may be laid horizontally upon the rear part of the kettle by holding it until the returns 18 have passed over the notches 19, thus bringing the handle 16 into proximity with the handle 12, as when the kettle is not in use.

It is desirable at times, while using the kettle, to maintain the bail thereof in a substantially vertical position, and this is effected by providing the ears 13 and 14 with oppositely extending lateral projections 20 and 21, which are so arranged as to intercept the forward movement of the bail toward the pouring edge 11 of the kettle. The said projections 20 and 21 are positioned forwardly of the transverse vertical central line of the ears, so that as the bail is thrown forwardly over the center line, it engages the said projections which act as positive stops to its further forward movement, so that the bail cannot come into contact with the pouring edge of the kettle. This is desirable in some uses to which the kettle is put. In such position the returns 18 of the bail rest upon the upper edges of the ears, and the bends at the lower end of the bail swing into engagement with the opposite side wall of the perforations 17.

This application is a division of my former application Serial No. 183,547, filed April 13, 1927, on which Letters Patent No. 1,644,063 were granted Oct. 4, 1927.

Having thus described my invention, what I claim and desire to secure by Letters Patent of the United States, is:

1. The combination of a kettle having perforated ears attached to opposite sides thereof, and a bail with portions thereof permanently engaged in the perforations of the ears, each said ear being notched transversely upon its upper edge at one side of the transverse vertical central line of the ears, to support the bail in rearwardly inclined position by engagement of other portions thereof with the said notches, and fixed stops on the ears on the other side of said central line to engage the bail and support it in forward elevated position.

2. The combination of a kettle having a handle upon its rear side and perforated ears attached to opposite sides thereof between the said handle and the pouring edge, and a bail having portions permanently engaged in the perforations of the ears, each said ear being notched transversely upon its rear edge at one side of the transverse vertical central line of the ear, to support the bail in rearwardly inclined position by engagement of other portions of the bail with the said notches, the ears being also provided with oppositely extending stops on the other side of said central line to engage the bail and support it clear of the pouring edge of the kettle.

3. The combination of a kettle having perforated ears attached to opposite sides thereof, and a bail permanently engaged in said perforations, each said ear being notched transversely upon its rear edge at one side of its transverse vertical central line to support the bail in rearwardly inclined position by engagement of the bail with said notches and with one wall of the perforations, the said ears being also provided with fixed stops at the other side of the said central line to support the bail in forward elevated position by engagement with the said stops and the opposite wall of said perforations.

4. The combination of a kettle having ears attached to opposite sides thereof, and a bail, the said ears each being transversely perforated to provide for lateral movement of the end of the bail engaged therein, each said ear having a notch in its edge at one side of its transverse vertical central line and a fixed stop at the other side of the said center line, whereby the bail may be supported in rearwardly inclined position by engaging the said notches and the wall at one side of the perforations, and in forward elevated position by engagement with the fixed stops and the wall at the opposite side of the perforations.

In testimony whereof, I have signed my name at West Bend, this 29th day of August, 1927.

RALPH N. KIRCHER.